(No Model.) 2 Sheets—Sheet 1.
C. A. WELLER.
APPARATUS FOR SETTING TORPEDO SIGNALS.
No. 470,729. Patented Mar. 15, 1892.
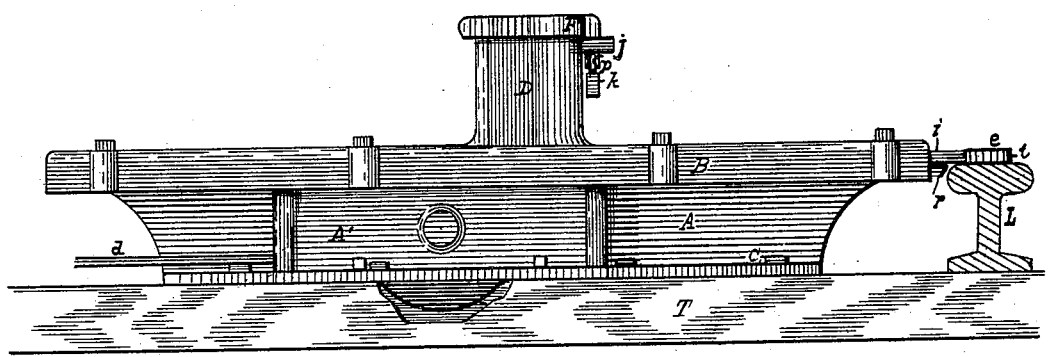
Fig. I
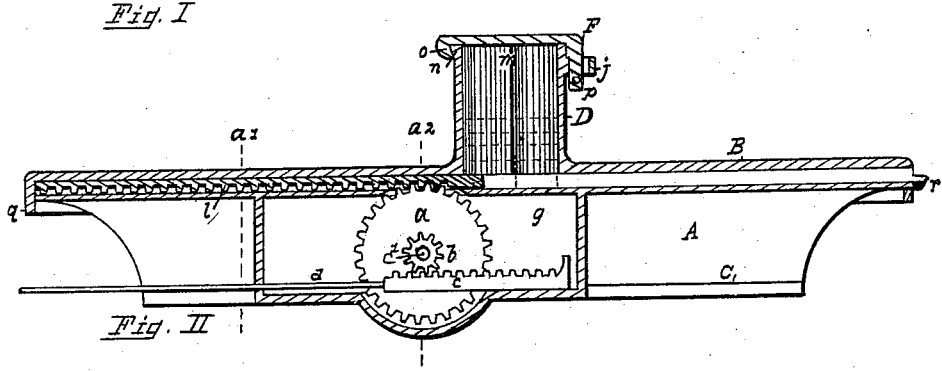
Fig. II
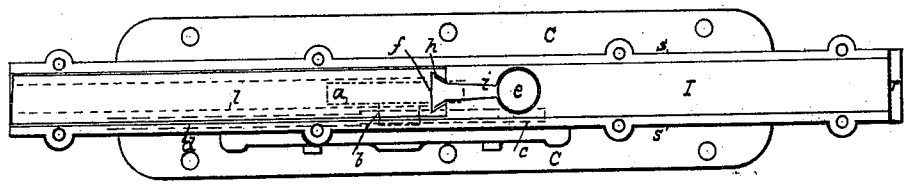
Fig. III
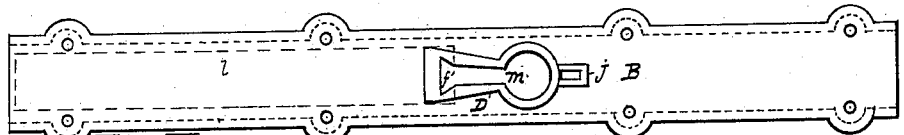
Fig. IV
WITNESSES:
A. E. Anderson
R. E. Briggs
INVENTOR
Chester A. Weller
BY H. Anderson
ATTORNEY.

(No Model.) 2 Sheets—Sheet 2.
C. A. WELLER,
APPARATUS FOR SETTING TORPEDO SIGNALS.
No. 470,729. Patented Mar. 15, 1892.
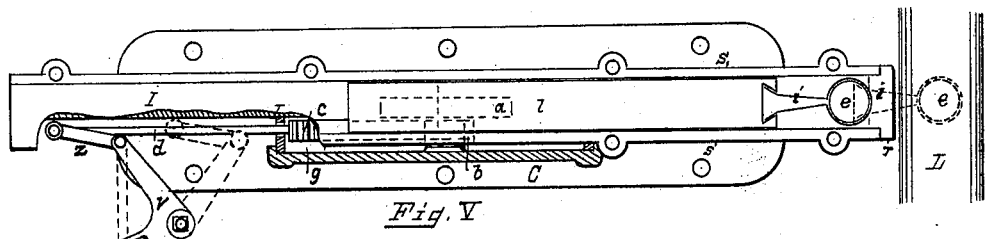
Fig. V.
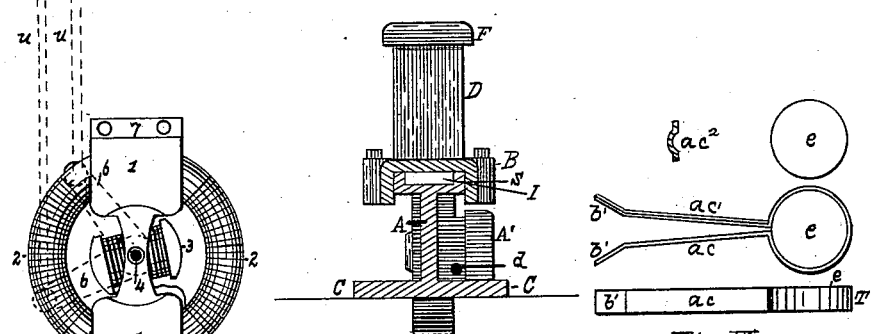
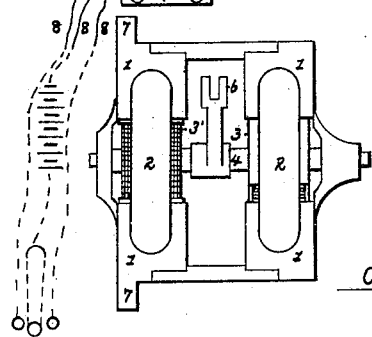
Fig. VI.
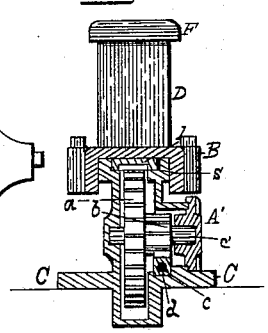
Fig. VII.
Fig. VIII.
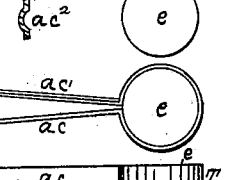
Fig. IX.
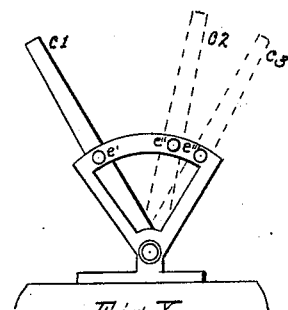
Fig. X.
WITNESSES:
H. E. Anderson
R. E. Briggs.
INVENTOR
Chester A. Weller
BY
H. Anderson
—ATTORNEY.

UNITED STATES PATENT OFFICE.

CHESTER A. WELLER, OF SING SING, NEW YORK, ASSIGNOR, BY DIRECT AND MESNE ASSIGNMENTS, OF SIXTEEN-TWENTIETHS TO JOHN GIBNEY, SMITH LENT AND CHARLES H. ACLY, OF SAME PLACE, AND CHARLES T. TITUS, OF SCARBOROUGH, NEW YORK.

APPARATUS FOR SETTING TORPEDO-SIGNALS.

SPECIFICATION forming part of Letters Patent No. 470,729, dated March 15, 1892.

Application filed August 22, 1891. Serial No. 403,480. (No model.)

*To all whom it may concern:*

Be it known that I, CHESTER A. WELLER, a citizen of the United States, residing at Sing Sing, county of Westchester, and State of New York, have invented new and useful Improvements in Apparatus for Setting Torpedo-Signals, of which the following is a specification; and I declare it to be a full and accurate description of the same, such as will enable others skilled in the art to which it appertains to make and use the same.

My invention relates to the signaling of railroad-trains by means of torpedoes placed on the track; and its object is to afford means for placing and recovering them by the ordinary signal-levers or by touching an electric key or switch. The object is attained by the means about to be described, reference being had to the drawings accompanying this specification.

Figure I represents the apparatus in elevation and in action, a torpedo being shown in place on the rail. Fig. II is a cross-section showing the internal mechanism. Fig. III is a plan of the apparatus, showing the top cover removed. Fig. IV is a top view of the covering-plate. Fig. V is a plan and partly sectional view showing the lever-operating mechanism and an electrical operating attachment. Fig. VI is a plan of the electrical operating device. Fig. VII is a vertical cross-section through line $a'$, Fig. II, and through line $a^2$ of the same figure a cross-section is given in Fig. VIII. Fig. IX illustrates different views of the torpedoes adapted to my apparatus. Fig. X illustrates an ordinary swing-lever.

Referring to Fig. I, it will be seen that the casing of this apparatus consists principally of two parts—a base A, which is secured to a tie close to the railroad-track, and a covering-piece B, carrying a magazine D and having a drooping edge all around, except at the rail end of the pathway of the torpedo. The cover to the magazine is secured from removal by a padlock $k$.

A represents a plate bolted to a chamber about midway of the length of the base, which incloses operating-gearing.

Reference to Figs. VII and VIII will show the base A to consist at each end of an upright flange broadening on both sides at the bottom into flanges C, upon which the whole rests. This upright portion, however, is expanded near the center into the gearing-chamber, as shown in Figs. II and III, the latter in cross-section. The top of the flange is broadened into flanges with ribs $s$ on the edges, forming a pathway I the full length and of a width and depth proportioned to the dimensions of the torpedo $e$. In this path I a slide $l$ is made to move freely. One end of the slide is notched (shown here in dovetail form) to receive the extensions $i$ from the torpedo. It is plain that as the slide is moved back and forth in its track it will carry the torpedo with it.

The slide $l$ is provided on its under side with rack-teeth, as shown in Fig. II, with which a gear-wheel $a$ engages. Upon the spindle of the wheel $a$ or fast to the same spindle a pinion $b$ engages with a rack $c$. (Shown here as operating under the pinion.) These geared parts are so proportioned that an outward pull of the rack $c$ will cause a revolution of the pinion $b$, and consequently of the wheel $a$, and the latter will propel the slide $l$ the full length of its track, as shown in Fig. I. If special situations should require a reversal of this operation by placing the rack above the pinion, then the machine is operated by pushing the spindle $d$ inward.

In Fig. II the slide $l$ is shown to be in its normal place. In the plan view of the top, Fig. IV, it will be seen that internally the magazine conforms to the shape of the torpedo. When the slide $l$ lies as in Figs. II and III, the part $f'$ of the magazine and the notch $f$ in the end of the slide conforming to it will coincide, as shown in Fig. IV.

Torpedoes as commonly used are illustrated in the three parts of Fig. IX. $e$ represents the torpedo. Usually it is provided with an encircling wire extending into lengths $a\,c\,a\,c'$. In place of the wires I use encircling strips of tin, so as to have these extensions of parallel widths with the torpedo, as at T, and these I bend to a shape, as shown, to conform to the sides of the magazine. If necessary, in order to stiffen them, they may be corrugated, as at $a\ c'$, and in cross-section at $a\ c^2$. The extreme ends $b\ b'$ are made to conform to the notch in the end of the slide $l$. When the slide $l$ is in its normal position and torpedoes are placed in the magazine D, as indicated by broken lines in Fig. II, of course the bottom torpedo will lie in the track I with the ends of the extension-pieces held by the notch in the slide $l$. When the slide is pushed forward, it will carry the torpedo with it, and on the return of the slide will carry the torpedo back if it has not been used. If the slide returns without the torpedo, then as soon as the slide reaches its place the torpedoes above will drop and another one will be in readiness for the movement of the slide.

In Fig. V the gearing is represented as operated through a bell-crank $v$. The rod $d$ is secured to the rack $c$ and by means of a link $z$ is united to the bell-crank, as shown. The other arm of the crank is slotted at $y$, so the operating connection may be suitably adjusted.

The most desirable way of using this torpedo-signal will probably be in connection with the ordinary signal, consisting of an arm raised and dropped by means of a lever, as shown by Fig. X. The normal position of the lever would be as at $c^2$ when the signal-arm was down. When the lever is thrown to the position $c^3$, the arm would be raised. The lever mechanism of my torpedo-signal would be united to the connections between the arm-signal and the lever $c'$. In the ordinary setting of the arm-signal the lever $c'$ would be moved to the position of $c^2$, and the same movement would also operate the torpedo-machine and carry a torpedo to a position close to the rail, as indicated in Fig. V. Now, if from any cause an audible as well as visible signal needs to be given, by moving the lever from the position $c^2$ to that of $c^3$ the torpedo-machine will be again acted upon and will place the torpedo on the rail, as by the broken lines, Fig. V. Throwing the lever back to the position $c'$ restores the torpedo to a position under the magazine, if it has not been exploded, and the arm-signal to a "safety" indication.

The only change to be made in the common signaling devices to enable them to operate my torpedo-setter in this combination with the common signals is to unite the lever connections and by providing in the lever device an additional stop for the lever, as at $e'''$.

$e'$ is the stop for the "safety" position of the lever, $e''$ for the danger-signal, and $e'''$ for the torpedo-signal.

Of course this apparatus may be used independently from any other signal and may be operated by a lever, as just described, or it may be manipulated electrically, as shown in Fig. V, in which the crank $v$ of the torpedo-machine is shown by broken lines $u\ u$ to be connected with a lever 6 on a spindle 4, to which a pair of armatures 3' 3 are secured. The armatures and field-magnets 1 1 2 2 are wound to produce a maximum magnetic effect. By passing a current alternately through first one and then the other of these armature and field combinations the lever 6 is caused to vibrate, and thus operate the torpedo signaling.

A battery and circuit to the motor are indicated at 8 8.

Flanges for securing the motor to a frame or base are indicated at 7 7.

The bell-crank $v$ is provided with a slot $y$, by means of which the amount of its movement is adjusted.

It will be observed that the torpedoes are entirely protected from the weather. The magazine at the end $f'$ is given a beveled projecting lip $n$, and has a perforated lug $j$ on the opposite side. The cap F fits over the front lip $n$, and a finger $p$ on the opposite end projects through the lug where it is secured by the padlock $k$. Of course until the finger $p$ is released the cap cannot be lifted over the lip $n$. The cap has a drooping flange all around its edge, so that water cannot enter the magazine. The cover B has also a drooping flange around its edge for the same purpose—i. e., to keep out water. The gearing-chamber is closed by the cap A' and packed in such a manner as to keep out moisture. As will be seen in Fig. VIII, the bearings for the gearing-spindle do not pass through the plates. The only chance for the penetration of moisture is through the opening at the end of the exit of the torpedo, and by giving the apparatus a slight inclination toward the rail none can enter from that point.

The apparatus is set far enough from the track to avoid any contact with the tread of car-wheels, and to afford a solid way for the travel of the torpedo a lip $r$ is continued from the end of the frame to very near the rail.

Having described my invention, what I claim, and desire to secure by Letters Patent of the United States, is—

1. The combination, in an apparatus for setting torpedoes, of a base having supporting-flanges, a gearing-chamber, and a torpedo-track, a cover for the same provided with a torpedo-magazine, a torpedo-carrier, and gearing for operating said carrier, substantially as herein shown and described.

2. The combination, in an apparatus for setting torpedoes, with the base A, provided with a chamber for the operating-gearing and a track for a torpedo-carrier, substantially as shown, of the carrier $l$, provided with rack-teeth, gear-wheels $a\ b$, and rack $c$, substantially as herein shown and described.

3. The combination, in an apparatus for setting torpedoes, of a torpedo-carrying slide, slide-moving gearing, substantially as described, operated by signal-moving devices, a torpedo-magazine above the carrier, and a torpedo-path terminating close to the railroad-track, allowing of the deposit of the torpedo on the track, substantially as shown and described.

4. The combination, with the torpedo-setting apparatus, as described, of a signal-operating lever provided with an additional lever-stop for the torpedo-setting mechanism, whereby the torpedo is exposed only when actually required, substantially as shown and described.

5. In combination with a torpedo-setting carrier operated by racks and gearing, as shown, a bell-crank for operating the propelling-rack, having a slotted arm for adjusting the movement of the torpedo-carrier, substantially as shown.

6. For the purposes of an apparatus for setting torpedoes, substantially as described, a torpedo provided with a sheet-metal band bent to conform to the shape of the magazine and to the notch in the carrying-slide, substantially as herein shown.

7. In an apparatus for setting torpedoes, as described, a cover sealing the top of the magazine, consisting of a plate with a drooping flange fitting the outside of the magazine, the inner edge of one end conforming to a projecting beveled lip on the corresponding end of the magazine, and a finger on the opposite end to pass through a lug on the corresponding end of the magazine, where it may be locked, substantially as described.

8. The combination, in an apparatus for setting torpedoes, with the rack $c$ and its connecting-rod $d$, link $z$, and a lever 6, attached to the spindle, of an armature 3, magnetic field-pieces 1 2, and suitable battery-circuits leading from the windings thereof to an operating-switch, substantially as herein shown and described.

9. The combination, in an apparatus for setting torpedoes, of the magazine D, provided with a locked cover, inclosed torpedo-path I, slide $l$, notched to carry a torpedo and provided with rack-teeth, support A, gear-wheels $a$ $b$, supported on spindle $c$ within an inclosed chamber and engaging with racks $l$ and $c$, and rod $d$, link $z$, and bell-crank $v$, substantially as shown and described.

Signed at Sing Sing, county of Westchester, and State of New York, this 8th day of August, 1891.

CHESTER A. WELLER.

Witnesses:
CHARLES WESLEY,
EDGAR L. RYDER.